United States Patent [19]

Choe et al.

[11] Patent Number: 4,659,177
[45] Date of Patent: Apr. 21, 1987

[54] ORGANIC NONLINEAR OPTICAL MEDIA

[75] Inventors: Eui W. Choe, Randolph; Garo Khanarian, Berekely Heights, both of N.J.; Anthony F. Garito, Radnor, Pa.

[73] Assignee: Celanese Corporation, New York, N.Y.

[21] Appl. No.: 797,465

[22] Filed: Nov. 13, 1985

[51] Int. Cl.$^4$ .......... G02B 6/00; B32B 9/04; C07C 50/00
[52] U.S. Cl. .......... 350/96.34; 428/411.1; 428/441; 260/396 N
[58] Field of Search .......... 428/441, 411.1; 350/96.34

[56] References Cited

U.S. PATENT DOCUMENTS 3,115,506 12/1963 Acker et al. .......... 260/396 N
3,153,658 10/1964 Hertler .......... 260/396 N

Primary Examiner—P. C. Ives
Attorney, Agent, or Firm—Depaoli & O'Brien

[57] ABSTRACT

In one embodiment this invention provides a nonlinear optical medium which consists of a transparent solid substrate coated with a Langmuir-Blodgett deposition of at least one molecular monolayer of uniaxial aligned charge asymmetric quinodimethane molecules, such as 7,7-bis(hexadecylamino)-8,8-dicyanoquinodimethane:

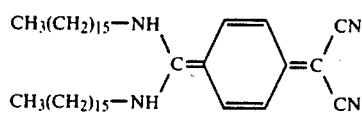

41 Claims, 1 Drawing Figure

SECOND ORDER RESPONSE OF LANGMUIR-BLODGETT MONOLAYER
7,7-DI(n-HEXADECYLAMINO)-8,8-DICYANOQUINODIMETHANE

ORGANIC NONLINEAR OPTICAL MEDIA

This invention was made with Government support under Contract No. F49620-85-C-0047 awarded by the Department of Defense (DOD). The Government has certain rights in this invention.

DESCRIPTION OF THE INVENTION

It is known that organic and polymeric materials with large delocalized π-electron systems can exhibit an exceptional nonlinear optical response, which in many cases is a much larger response than by inorganic materials.

In addition, the properties of organic and polymeric materials can be varied to optimize other desirable properties such as mechanial, thermal, chemical and oxidative stabilities and high laser damage threshold, without changing the excitations and interactions responsible for the observed nonlinear optical properties.

One aspect of nonlinear optical organic substrate research involves the investigation of external field-induced dipolar alignment of molecules in a substrate such as a thin film. This has been demonstrated to occur for guest dipolar molecules in a polymer host when an electric field is applied to the organic mixture above the glass transition temperature of the polymer host. Noncentrosymmetric polar structures in organic crystals and molecular aggregates have been achieved in this manner. There are other alignment methods such as those based on shear-induced uniaxial orientation of polymeric films and fibers.

Thin films of organic or polymeric materials with large second order nonlinear optical responses in combination with silicon-based electronic circuitry have potential as systems for laser modulation and deflection, information control in optical circuitry, and the like.

Other novel processes occurring through third order nonlinear optical response such as degenerate four-wave mixing, whereby real-time processing of optical fields can occur, have potential utility in such diverse fields as optical communications and integrated circuit fabrication.

Of particular importance for conjugated organic systems is the fact that the origin of the nonlinear optical properties is the polarization of the π-electron cloud in contrast to nuclear vibration and displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above-recited publications are incorporated herein by reference.

Prior art of interest with respect to the present invention are publications relating to quinodimethane compounds, such as U.S. Pat. No. 3,115,506; J. Am. Chem. Soc., 94, 3370 (1962); J. Am. Chem., Soc., 94, 3387 (1962); J. Colloid Interface Sci., 62(1), 119 (1977); and Applied Phys. Letters, 39, 940 (1981); incorporated herein by reference.

There is continuing research effort to develop new organic nonlinear optical media for prospective novel phenomena and devices adapted for optical signal processing and optical telecommunications technologies. The potential utility of organic materials with large second order and third order nonlinear optical properties for high frequency application contrasts with the property limitations inherent in conventional inorganic and semiconductor nonlinear optical materials.

Accordingly, it is an object of this invention to provide novel organic nonlinear optical media.

It is another object of this invention to provide solid organic substrates exhibiting a high second order nonlinear optical susceptibility.

It is another object of this invention to provide a nonlinear optical medium which comprises a noncentrosymmetric configuration of aligned molecules having a charge asymmetric quinodimethane structure.

It is a further object of this invention to provide a process for producing a nonlinear optical medium by Langmuir-Blodgett deposition of an organic coating on a transparent solid substrate.

Other objects and advantages of the present invention shall become apparent from the accompanying description and examples.

DESCRIPTION OF THE INVENTION

One or more objects of the present invention are accomplished by the provision of a nonlinear optical medium comprising a transparent solid substrate with a surface coating of at least one monomolecular layer of uniaxial aligned quinodimethane molecules corresponding to the formula:

where R' is a substituent selected from hydrogen and aliphatic, alicyclic and aromatic groups containing between about 6–30 carbon atoms; n is an integer with a value between about 0–3; and at least one of the R' substituents is an electron-donating group.

R' can be hydrogen or an aliphatic, cycloaliphatic aromatic group such as methyl, chloroethyl, methoxyethyl, pentyl, decyl, 2-propenyl, 2-propynyl, cyclohexyl, phenyl, tolyl, and the like.

Illustrative of R' electron-donating substituents are amino, alkylamino, alkenylamino, alkynylamino, alkoxy, alkylthio, phosphinyl, and the like.

Quinodimethane compounds of particular interest are those which have a charge asymmetric quinodimethane conjugated structure. Quinodimethane structures of preference are those corresponding to the formulae;

R in the above formulae is a substituent selected from aliphatic, alicyclic and aromatic groups containing between about 6-30 carbon atoms, and $R^1$ is hydrogen or a R substituent.

Illustrative of the R substituent in the quinodimethane formulae are groups which include hexyl, 2-methylhexyl, 2-chlorohexyl, 4-ethoxybutyl, hex-5-enyl, octyl, decyl, dodecyl, hexadecyl, eicosyl, cyclopentyl, cyclohexenyl, phenyl, chlorophenyl, tolyl, methoxyphenyl, benzyl, pyridyl, and the like.

Preferred quinodimethane structures of the above formulae are those in which R is an aliphatic group (e.g., alkyl) containing between about 10-20 carbon atoms, and $R^1$ is hydrogen.

The $RR^1N$ group can also represent a heterocyclic structure such as piperazyl, piperizyl or morpholinyl.

The $(RR^1N)_2C=$ moiety in the formulae can constitute a heterocyclic radical in which the two amino groups taken together with the connecting methylidene carbon atoms form a cyclic structure such as imidazoline in the quinodimethane compounds:

The quinodimethane compounds can also contain substituents which have one or more optically active asymmetric centers, such as chiral isomeric structures corresponding to the formulae:

In all of the quinodimethane structural formulae illustrated herein the cyclic quinoid groups can have one or more of the hydrogen positions on the ring carbon atoms replaced with a substituent such as alkyl, halo, alkoxy, phenyl, and the like, or can be integrated as part of a more complex fused polycyclic ring structure.

Unique nonlinear optical response is exhibited by invention optical media in which the surface coating comprises at least two monomolecular layers of uniaxial aligned quinodimethane molecules. The surface coating normally is in the form of a laminate of stacked molecular monolayers having the characteristics of a continuous film.

A typical nonlinear optical medium of the present invention has a macroscopic noncentrosymmetric configuration, and exhibits a second order susceptibility $\beta$ of at least about $200 \times 10^{-30}$ esu, a second order susceptibility $X^{(2)}$ of at least about $1 \times 10^{-6}$ esu, and a Miller's delta of at least about one square meter/coulomb.

In another embodiment, this invention provides an electrooptic light modulating device with a nonlinear optical component comprising a transparent solid substrate with a surface coating of at least one monomolecular layer of uniaxial aligned quinodimethane molecules corresponding to the formula:

where $R'$ is a substituent selected from hydrogen and aliphatic, alicyclic and aromatic groups containing between about 6-30 carbon atoms; n is an integer with a value between about 0-3; and at least one of the $R'$ substituents is an electron-donating group; as previously defined.

Illustrative of preferred quinodimethane molecules in the above device embodiment are those corresponding to one of the formulae:

where R is a substituent selected from aliphatic, alicyclic and aromatic groups containing between about 6-30 carbon atoms, and $R^1$ is hydrogen or a R substituent, as peviously defined.

A surface coating which is noncentrosymmetric exhibits second order nonlinear optical response to laser-type electromagnetic excitation, and a surface coating which is centrosymmetric exhibits third order nonlinear optical response.

The term "Miller's delta" as employed herein with respect to second harmonic generation (SHG) is defined by an equation as elaborated by Garito et al in Chapter 1, "Molecular Optics: Nonlinear Optical Properties Of Organic And Polymeric Crystals"; ACS Symposium Series 233 (1983).

The quantity "delta"($\delta$) is defined by the equation:

$$d_{ijk} = \epsilon_o X_{ii}^{(1)} X_{jj}^{(1)} X_{kk}^{(1)} \delta_{ijk}$$

where terms such as $X_{ii}^{(1)}$ are representative linear susceptibility components, and $d_{ijk}$, the second harmonic coefficient, is defined through $$\chi_{ijk}^{(2)}(-2\omega; \omega,\omega) = 2d_{ijk}(-2\omega; \omega,\omega)$$

The Miller's delta ($10^{-2}$ m²/c at 1.06 μm) of various nonlinear optical crystalline substrates are illustrated by KDP(3.5), LiNbO₃(7.5), GaAs(1.8) and 2-methyl-4-nitroaniline(160).

Such comparative figures of merit are defined over the frequency range extending to zero frequency, or equivalently DC, and the polarization electrooptic coefficient as described in the publication by Garito et al cited above.

The term "phase matching" as employed herein refers to an effect in a nonlinear optical medium in which a harmonic wave is propagated with the same effective refractive index as the incident fundamental light wave. Efficient second harmonic generation requires a nonlinear optical medium to possess propagation directions in which optical medium birefringence cancels the natural dispersion, i.e., the optical transmission of fundamental and second harmonic waves is phase matched in the medium. Phase matching can provide a high conversion percentage of the incident light to the second harmonic wave.

The term "external field" as employed herein refers to an electric, magnetic or mechanical stress field which is applied to a substrate of mobile organic molecules, to induce dipolar alignment of the molecules parallel to the field.

The term "optically transparent" as employed herein refers to an optical medium which is transparent or light transmitting with respect to incident fundamental and created light frequencies. In a nonlinear optical device, a present invention nonlinear optical medium can be transparent to both the incident and exit light frequencies.

The term "charge asymmetric" as employed herein refers to the dipolarity characteristic of organic molecules containing an electron-withdrawing group which is in conjugation with an electron-donating group. There is an asymmetric distribution of electron density in the π-electron structure of the organic molecules.

Synthesis of Quinodimethanes

Charge asymmetric quinodimethane compounds in accordance with the present invention can be prepared by procedures described in prior art such as U.S. Pat. No. 3,115,506.

The preparation of novel diphenoquinodimethane for the practice of the present invention is described in copending patent application Ser. No. 748,583, filed June 25, 1985; incorporated by reference.

The following reaction scheme is illustrative of a general synthesis procedure:

TCNQ

+ 2 RR'NH.HCN

If RR¹NH is dodecylamine, then the product is 7,7-di(dodecylamino)-8,8-dicyanoquinodimethane. If RR¹NH is di(hexadecyl)amine, then the product is 7,7-di[di(hexadecyl)-amino]-8,8-dicyanoquinodimethane.

A compound, such as 13,13-diamino-14,14-dicyanodiphenoquinodimethane can be synthesized from 4,4'-dimethyldiphenyl in accordance with the following series of chemical reactions steps:

where R is ALKYL (e.g., C₁₆H₃₃)
*2,3-dichloro-5,6-dicyano-1,4-benzoquinone

Langmuir-Blodgett Deposition Technique

In another embodiment, this invention provides a process for preparing a nonlinear optical medium which comprises coating a transparent solid substrate surface by Langmuir-Blodgett deposition technique with at least one monomolecular layer of uniaxial aligned quinodimethane molecules corresponding to the formula:

where R' is a substituent selected from hydrogen and aliphatic, alicyclic and aromatic groups containing between about 6-30 carbon atoms; n is an integer with a value between about 0-3; and at least one of the R' substituents is an electron-donating group; as previously defined.

Illustrative of preferred quinodimethane molecules in the deposited molecular monolayer in the above process embodiment are those corresponding to one of the formulae:

where R is a substituent selected from aliphatic, alicyclic and aromatic groups containing between about 6-30 carbon atoms, and $R^1$ is hydrogen or a R substituent, as previously defined.

The Langmuir-Blodgett technique is reviewed in J. Macromol. Sci.-Rev. Macromol. Chem., C21(1), 61(1981); incorporated by reference.

An extensive elaboration of Langmuir-Blodgett technology is published in Thin Solid Films, Vol. 99(1983), which includes papers presented at the First International Conference On Langmuir-Blodgett Films, Durham, Great Britain, Sept. 20-22, 1982; Elsevier Sequoia S.A., Lausanne; incorporated by reference.

In 1917 Irving Langmuir developed the experimental and theoretical concepts which underlie our understanding of the behavior of organic molecules in insoluble monolayers on the surface of water. Langmuir demonstrated that long-chain fatty acids on the surface of water form films in which the molecules occupy the same cross-sectional area whatever the chain length of the molecules. The films are one molecule thick, and the molecules are oriented at the water surface, with the polar functional group immersed in the water and the long nonpolar chain directed nearly vertically up from the water surface.

This understanding of the nature of insoluble monolayers was facilitated by the development of a surface balance, which is associated with Langmuir's name.

In 1919 Langmuir reported a development in which fatty acid monolayers on water surfaces were transferred to solid supports such as glass slides. In 1933 Katherine Blodgett announced the discovery that sequential monolayer transfer could be accomplished to form built-up multilayer films, i.e., unitary laminate structures now universally referred to as "Langmuir-Blodgett films".

Grunfeld et al in Thin Solid Films, 99, 249(1983) demonstrate the application of a Langmuir-Blodgett layer as a potentially useful integrated optics component by employing the optical absorption anisotropy of a diacetylene film in a polarization mode filter.

The present invention quinodimethane compounds are amenable to Langmuir-Blodgett deposition procedures for the formation of monolayer and multilayer continuous film coatings on solid substrates such as optical glass.

Solid Organic Guest-host Substrates

This invention further provides transparent nonlinear optical polymeric substrates having incorporated therein a distribution of dipolar quinodimethane guest molecules.

Illustrative of a product embodiment is a nonlinear optical medium in the form of a transparent solid substrate comprising (1) a host thermoplastic polyer; and (2) a guest organic compound which has a quinodimethane structure corresponding to the formula:

where R' is a substituent selected from hydrogen and aliphatic, alicyclic and aromatic groups containing between about 6-30 carbon atoms; n is an integer with a value between about 0-3; and at least one of the R' substituents is an electron-donating group.

Illustrative of a preferred type of quinodimethane compound in the above nonlinear optical medium embodiment is a compound corresponding to one of the formulae:

where R is a substituent selected from aliphatic, alicyclic and aromatic groups containing between about 6-30 carbon atoms, and $R^1$ is hydrogen or a R substituent.

When a transparent solid medium is noncentrosymmetric, it exhibits second order and third order nonlinear optical responses, and when the substrate is centrosymmetric it exhibits only third order nonlinear optical response.

Illustrative of this type of optical medium is a poly(methylmethacrylate) film containing a distribution of 7,7-bis(hexadecylamino)-8,8-dicyanoquinodimethane molecules.

If the distribution of guest molecules is random, there is orientational averaging by statistical alignment of the dipolar molecules in the polymeric host, and the optical substrate exhibits third order nonlinear optical properties.

If the distribution of guest molecules is at least partially uniaxial in molecular orientation, then the optical medium exhibits second order nonlinear optical properties. One method for preparing polymeric films with large second order nonlinear optical properties is to remove the orientational averaging of a dopant molecule with large $\beta$ susceptibility by application of an external electric field or magnetic field to a softened film. This can be accomplished by heating the film above the host polymer glass-transition temperature $T_g$, then cooling the film below $T_g$ in the presence of the external field.

The formation of a thin host polymer matrix containing guest molecules having, for example, uniaxial orthogonal molecular orientation can be achieved by inducing a dipolar alignment of the guest molecules in the matrix with an externally applied field of the type described above.

In one method a thin film of the polymer [e.g., poly(N,N-dimethylacrylamide)] containing agent molecules [e.g., 7,7-bis(benzylamino)-8,8-dicyanoquinodimethane] is cast between electrode plates. The polymer matrix then is heated to a temperature above the second order transition temperature of the polymer. A DC electric field is applied (e.g., at a field strength between about 400–100,000 V/cm) for a period sufficient to align all of the guest molecules in a unidirectional orthogonal configuration parallel to the transverse field. Typically the orientation period will be in the range between about one second and one hour, as determined by factors such as guest molecular structure and field strength.

When the orientation of guest molecules is complete, the polymer matrix is cooled below its second order transition temperature, while the matrix is still under the influence of the applied DC electric field. In this manner the uniaxial orthogonal molecular orientation of guest molecules is immobilized in a rigid structure.

The uniaxial molecular orientation of the guest molecules in the polymer matrix can be confirmed by X-ray diffraction analysis. Another method of molecular orientation measurement is by optical characterization, such as optical absorption measurements by means of a spectrophotometer with a linear polarization fixture.

In another embodiment, this invention provides an electrooptic light modulating device with a nonlinear optical component in the form of a transparent solid medium comprising (1) a host thermoplastic polymer; and (2) a guest organic compound which has a quinodimethane structure corresponding to the formula:

$$\begin{array}{c} R' \\ \diagdown \\ C= \\ \diagup \\ R' \end{array} \!\!\!\!\!\!\left[\!\!\!\begin{array}{c} \\ \\ \end{array}\!\!\!\right]_n\!\!\!\!\!\!\begin{array}{c} CN \\ \diagup \\ =C \\ \diagdown \\ CN \end{array}$$

where R' is a substituent selected from hydrogen and aliphatic, alicyclic and aromatic groups containing between about 6–30 carbon atoms; n is an integer with a value between about 0–3; and at least one of the R' substituents is an electron-donating group.

Illustrative of a preferred type of quinodimethane compound in the above device embodiment is a compound corresponding to one of the formulae:

where R is a substituent selected from aliphatic, alicyclic and aromatic groups containing between about 6–30 carbon atoms, and $R^1$ is hydrogen or a R substituent, as previously defined.

Nonlinear Optical Properties

The fundamental concepts of nonlinear optics and their relationship to chemical structures can be expressed in terms of dipolar approximation with respect to the polarization induced in an atom or molecules by an externally applied optical electric field.

As summarized in the ACS Symposium Series 233(1983), the fundamental equation (1) below describes the change in the electron distribution occurring between the molecular ground and excited states expressed as a power series of the electric field E which occurs upon interaction of such a field, as in the electric component of electromagnetic radiation, with single molecules. The coefficient $\alpha$ is the linear polarizability, $\beta$ and $\gamma$ are the second and third order molecular susceptibilities, respectively. The coefficients for these molecular susceptibilities are tensor quantities and therefore highly symmetry dependent. Odd order coefficients are nonvanishing for all structures on the molecular and unit cell level. The even order coefficients such as $\beta$ are zero for those structures which have a center of inversion symmetry on the molecular and/or unit cell level.

Equation (2) is identical with (1) except that it describes a macroscopic polarization, such as that arising from an array of molecules in a macroscopic sample.

$$p = \alpha E + \beta EE + \gamma EEE + \ldots \tag{1}$$

$$P = P_0 + X^{(1)}E + X^{(2)}EE + X^{(3)}EEE + \ldots \tag{2}$$

A present invention organic substrate typically is optically transparent and exhibits nonlinear optical properties such as second-harmonic and third-harmonic generation, and the linear electrooptic (Pockels) effect. For second-harmonic generation, the bulk phase of the organic substrate whether liquid or solid does not possess a real or orientational average inversion center. The substrate is a macroscopic noncentrosymmetric substrate.

Harmonic generation measurements relative to quartz can be performed to estabish the value of second order and third order nonlinear optical susceptibility of the substrates.

In the case of macroscopic nonlinear optical substrates that are composed of noncentrosymmetric sites on the molecular and unit cell level, the macroscopic second order nonlinear optical response $X^{(2)}$ is comprised of the corresponding molecular nonlinear optical response $\beta$. In the rigid lattice gas approximation, the macroscopic susceptibility $X^{(2)}$ is expressed by the following relationship:

$$X_{ijk}(-\omega_3; \omega_1,\omega_2) = Nf^{\omega_3}f^{\omega_2}f^{\omega_1} <\beta_{ijk}(-\omega_3; \omega_1,\omega_2)>$$

wherein N is the number of sites per unit volume, f represents small local field corrections, $\beta_{ijk}$ is averaged over the unit cell, $\omega_3$ is the frequency of the created optical wave, and $\omega_1$ and $\omega_2$ are the frequencies of the incident fundamental optical waves.

These theoretical considerations are elaborated by Garito et al in chapter 1 of the ACS Symposium Series 233 (1983) recited hereinabove; and by Lipscomb et al in J. Chem. Phys., 75, 1509 (1981), incorporated by reference. See also Lalama et al, Phys. Rev., A20, 1179 (1979); and Garito et al, Mol. Cryst. and Liq. Cryst., 106, 219 (1984); incorporated by reference.

The theory and practice of high performance nonlinear optical media, with specific reference to charge asymmetric quinodimethane type compounds, is elaborated in copending patent application Ser. No. 748,617, filed June 25, 1985; incorporated herein by reference.

The following examples are further illustrative of the present invention. The components and specific ingredients are presented as being typical, and various modifications can be derived in view of the foregoing disclosure within the scope of the invention.

EXAMPLE I

This Example illustrates the preparation of 13,13-di(n-hexadecylamino)-14,14-dicyano-4,5,9,10-tetrahydropyrenoquinodimethane.

A three-necked three-liter flask equipped with a mechanical stirrer, a nitrogen inlet, a drying tube, and an additional funnel is charged with 10 grams (0.03 mole) of 13,13,14,14-tetracyano-4,5,9,10-tetrahydropyrenoquinodimethane and ten liters of acetonitrile. Twenty-nine grams (0.12 mole) of n-hexadecylamine in 100 ml of acetonitrile is added dropwise into the flask, and the resulting mixture is stirred for one day at 70° C. The resulting acetonitrile solution is concentrated on a rotary evaporator.

The crude product in precipitate form is separated by filtration, washed with distilled water, neutralized with 10% solution of ammonium hydroxide, washed with water, and then recrystallized from N,N-dimethylformamide-water to yield 13,13-di(n-hexadecylamino)-14,14-dicyano-4,5,9,10-tetrahydropyrenoquinodimethane.

Following a similar procedure, 13,13-di(n-hexadecylamino)-14,14-dicyanodiphenoquinodimethane is prepared by employing an acetonitrile solution containing ten grams of 13,13,14,14-tetracyanodiphenoquinodimethane and thirty-two grams of n-hexadecylamine.

The second order nonlinear susceptibility $\beta$ is about $500 \times 10^{-30}$ esu after alignment of molecules in a DC field, or after alignment of molecules by the Langmuir-Blodgett Technique in which a monolayer or several layers of molecules are deposited on a glass substrate.

EXAMPLE II

This Example illustrates the preparation of 7,7-di(-hexadecylamino)-8,8-dicyanoquinodimethane.

A three-necked twelve-liter flask equipped with a mechanical stirrer, a nitrogen inlet, a drying tube, and an addition funnel is charged with 50 grams (0.245 mole) of 7,7,8,8-tetracyanoquinodimethane and 6.5 liters of tetrahydrofuran. A 241 gram quantity (1 mole) of n-hexadecylamine in 1800 ml of tetrahydrofuran is added dropwise into the flask, and the resulting mixture is stirred for three days at room temperature. The resulting THF solution is concentrated on a rotary evaporator.

The crude product in precipitate form is separated by filtration, washed with distilled water, neutralized with 10% solution of ammonium hydroxide, washed with water, and then recrystallized from 9 liters of 95% ethanol and finally from acetone to yield 86 grams of 7,7-di(n-hexadecylamino)-8,8-dicyanoquinodimethane; mp 224° C.; $\lambda_{max}^{C_2H_5OH}$374 nm (24,268); IR (KBr) 2144, 2176 (C≡N), 2920, 2848 (CH).

EXAMPLE III

This Example illustrates the preparation of 7,7-di(n-octadecylamino)-8,8-dicyanoquinodimethane.

Following the procedure of Example I, 7,7-di(n-octadecylamino)-8,8-dicyanoquinodimethane is prepared by employing a tetrahydrofuran solution containing ten grams (0.049 mole) of 7,7,8,8-tetracyanoquinodimethane and 53.8 grams (0.2 mole) of n-octadecylamine. The product has mp 224.7° C; $\lambda_{max}^{CH_3OH}$364 nm.

EXAMPLE IV

This Example illustrates the preparation of 7,7-di(n-tetradecylamino)-8,8-dicyanoquinodimethane.

Following the procedure of Example I, 7,7-di(tetradecylamino)-8,8-dicyanoquinodimethane is prepared by employing a tetrahydrofuran solution containing ten grams (0.049 mole) of 7,7,8,8-tetracyanoquinodimethane and 42.68 grams (0.2 mole) of n-tetradecylamine. The yield of the product is 18.1 grams; mp 222.2° C.; $\lambda_{max}^{CH_3OH}$365 nm.

EXAMPLE V

This Example illustrates the preparation of 7,7-di(n-tridecylamino)-8,8-dicyanoquinodimethane.

Following the procedure of Example I, 7,7-di(n-tridecylamino)-8,8-dicyanoquinodimethane is prepared by employing a tetrahydrofuran solution containing ten grams (0.049 mole) of 7,7,8,8-tetracyanoquinodimethane and 39.87 grams (0.2 mole) of n-tridecylamine in a yield of 17.1 grams; mp 224.1° C.; $\lambda_{max}^{CH_3OH}$365 nm.

EXAMPLE VI

P This Example illustrates the preparation of 7,7-di(n-dodecylamino)-8,8-dicyanoquinodimethane.

Following the procedure of Example I, 7,7-di(n-dodecylamino)-8,8-dicyanoquinodimethane is prepared by employing a tetrahydrofuran solution containing ten grams (0.049 mole) of 7,7,8,8-tetracyanoquinodimethane and 37.07 grams (0.2 mole) of n-dodecylamine in a yield of 10.85 grams; mp 221.9° C.; $\lambda_{max}^{CH_3OH}$365 nm.

EXAMPLE VII

This Example illustrates the preparation of 7,7-di(n-undecylamino)-8,8-dicyanoquinodimethane.

Following the procedure of Example I, 7,7-di(n-undecylamino)-8,8-dicyanoquinodimethane is prepared by employing a tetrahydrofuran solution containing ten grams (0.049 mole) of 7,7,8,8-tetracyanoquinodimethane and 34.27 grams (0.2 mole) of n-undecylamine. The compound has mp 219®C.; $\lambda_{max}^{C_2H_5OH}$373 nm.

EXAMPLE VIII

This Example illustrates the preparation of 7,7-di(n-decylamino)-8,8-dicyanoquinodimethane.

Following the procedure of Example I, 7,7-di(n-decylamino)-8,8-dicyanoquinodimethane is prepared by employing a tetrahydrofuran solution containing ten grams (0.049 mole) of 7,7,8,8-tetracyanoquinodimethane and 31.46 grams (0.2 mole) of n-decylamine in a yield of 10.3 grams; mp 216.4° C.; $\lambda_{max}^{CH_3OH}$364 nm; $\lambda_{max}^{DMSO}$376 nm.

When di(n-hexadecyl)amine is employed instead of n-decylamine, then the product is 7,7-di[di(hexadecyl)amino]-8,8-dicyanoquinodimethane.

EXAMPLE IX

This Example illustrates the behavior of a spread film which is deposited on a water surface by a Langmuir-Blodgett technique.

A freshly prepared solution with known concentration of 7,7-di(n-hexadecylamino)-8,8-dicyanoquinodimethane (0.5 mg) dissolved in high purity chloroform (1 ml) (Burdick and Jackson) is spread on a freshly distilled water (Millipore) subphase contained in a Langmuir-Blodgett film balance (Lauda) at 17.5° C. After complete evaporation of chloroform, the 7,7-di(n-hexadecylamino)-8,8-dicyanoquinodimethane monolayer film which is spread on the center surface is compressed by the movable barrier of the film balance and the measured surface pressure of (dynes/cm)-area ($Å^2$) exhibits two sharp rises in surface pressure greater than 20 dynes/cm at approximately areas of 100 $Å^2$ and 40 $Å^2$ which correspond to condensed films of 7,7-di(n-hexadecylamino)-8,8-dicyanoquinodimethane.

In this manner, the spread film behavior of 7,7-di(n-hexadecylamino)-8,8-dicyanoquinodimethane is studied as a function of barrier compression speed, subphase temperature, and subphase pH. For example, it is found that barrier compression speeds less than 1 cm/min provide conditions for highly reproducible spread film behavior. At constant pH below pH values of 7, decreased temperatures to as low as 8° C. result in sharpened rises in surface pressure—area isotherm near 100 $Å^2$ and 40 $Å^2$. At constant subphase temperature, increased subphase pH above pH values of 7 and to as high as 13 result in a single sharp rise in the surface pressure—area isotherm near 40 $Å^2$.

EXAMPLE X

This Example illustrates the transfer of a Langmuir-Blodgett condensed film onto a glass substrate.

Standard microscope glass slides (Fisher Scientific are cleaned by washing with acetone, sonicating in concentrated nitric acid, and rinsing with multiply-distilled water to provide slides for use as deposition substrates for 7,7-di(n-hexadecylamino)-8,8-dicyanoquinodimethane films. Following the procedures of Example IX, the deposition behavior of di(n-hexadecylamino)-8,8-dicyanoquinodimethane films is studied by transferring condensed films onto the glass substrate at a standard deposition speed of 3 mm/min.

It is found that a single deposition of a condensed 7,7-di(hexadecylamino)-8,8-dicyanoquinodimethane film at 17.5° C., pH 6.5, and surface pressure of 45 dynes/cm near 40 $Å^2$ results in successful transfer of 7,7-di(n-hexadecylamino)-8,8-dicyanoquinodimethane film onto the glass substrate as evidenced by a 1:1 area ratio between deposited film and spread film removed from the water surface. Optical absorption measurements over the ultraviolet visible range of the deposited 7,7-di(n-hexadecylamino)-8,8-dicyanoquinodimethane film indicates a single absorption maximum near 380 nm for 7,7-di(n-hexadecylamino)-8,8-dicyanoquinodimethane, as known from separate solution optical absorption measurements of the sample.

EXAMPLE XI

This Example illustrates the nonlinear properties of a 7,7-di(n-hexadecylamino)-8,8-dicyanoquinodimethane film.

Second harmonic generation measurements are conducted on the singly deposited 7,7-di(n-hexadecylamino)-8,8-dicyanoquinodimethane film of Example X by standard Maker rotation fringe methods employing quartz referenced photon counting techniques and a tunable dye laser source. Second harmonic signals from the 7,7-di(n-hexadecylamino)-8,8-dicyanoquinodimethane are observed by high sensitivity photomultiplier detection for fixed laser wavelengths from 1.06–0.7 $\mu$m. The ratio of second harmonic intensities of 7,7-di(n-hexadecylamino)-8,8-dicyanoquinodimethane film and quartz are determined at each fixed wavelength as illustrated in the figure.

EXAMPLE XII

Several samples of deposited symmetric bilayer films of 7,7-di(n-hexadecylamino)-8,8-dicyanoquinodimethane are prepared by depositing a second 7,7-di(n-hexadecylamino)-8,8-dicyanoquinodimethane layer on the first monolayer as in Example X. Each of the bilayer film samples of deposited 7,7-di(n-hexadecylamino)-8,8-dicyanoquinodimethane possesses a center of inversion symmetry, and as expected exhibits no second harmonic signal by the standard measurement methods of Example XI. In all the samples, optical absorption measurements confirmed the presence of 7,7-di(n-hexadecylamino)-8,8-dicyanoqunoddimethane films as in Example XI.

EXAMPLE XIII

Deposited asymmetric bilayer films of 7,7-di(n-hexadecylamino)-8,8-dicyanoquinodimethane with an intermediate layer of arachidic acid are prepared by following the procedures of Examples IX–X, with an aqueous subphase of cadmium chloride solution ($10^{-4}$M).

After single deposition of a 7,7-di(n-hexadecylamino)-8,8-dicyanoquinodimethane film on a glass slide, the remaining spread monolayer film of 7,7-di(n-hexadecylamino)-8,8-dicyanoquinodimethane is removed by vacuum suctioning and replaced with a spread monolayer of arachidic acid formed from a spread solution of zone-refined arachidic acid (1 mg) dissolved in chloroform (1 ml). The spread arachidic acid monolayer film is compressed to a condensed film at 20 dyne/cm surface pressure and 20 Å² area, and deposited onto the 7,7-di(n-hexadecylamino)-8,8-dicyanoquinodimethane film coated glass substrate.

After deposition of the arachidic acid monolayer film, the remaining spread monolayer film of arachidic acid is removed by vacuum suctioning and replaced with a spread monolayer of 7,7-di(n-hexadecylamino)-8,8-dicyanoquinodimethane. The deposition process is repeated to obtain two deposited asymmetric bilayers of 7,7-di(n-hexadecylamino)-8,8-dicyanoquinodimethane with an inner monolayer of arachidic acid.

As expected for a nonlinear material possessing a noncentrosymmetric structure which lacks a center of inversion symmetry, second harmonic generation is observed for the deposited asymmetric bilayer sample of 7,7-di(n-hexadecylamino)-8,8-dicyanoquinodimethane and intermediate arachidic acid layer from 1.06–0.7 μm using the standard laser measurement methods of Example XI.

Figure 1:
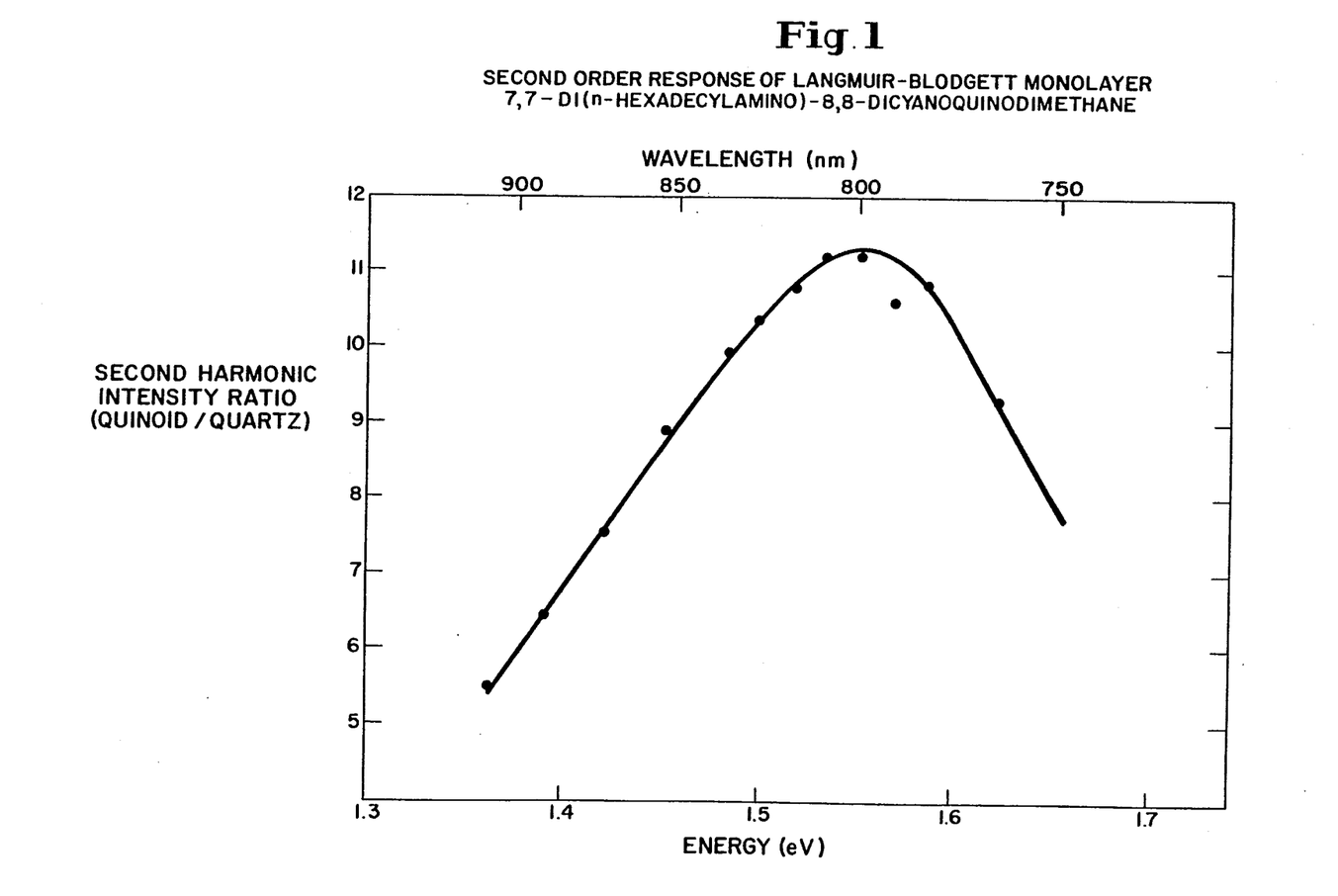

The ratio of second harmonic intensities of the asymmetric bilayer sample and quartz exhibits the same optical frequency behavior as the single 7,7-di(n-hexadecylamino)-8,8-dicyanoquinodimethane film of Example XI as illustrated in FIG. 1. At the same fixed frequency, the second harmonic intensity of the asymmetric bilayer sample is approximately four times larger than the second harmonic intensity of the single monolayer 7,7-di(n-hexadecylamino)-8,8-dicyanoquinodimethane film of Example XI, as predicted by established theory.

What is claimed is:

1. A nonlinear optical medium comprising a transparent solid substrate with a surface coating of at least one monomolecular layer of uniaxial aligned quinodimethane molecules corresponding to the formula:

where R' is a substituent selected from hydrogen and aliphatic, alicyclic and aromatic groups containing between about 6–30 carbon atoms; n is an integer with a value between 0–3; and at least one of the R' substituents is an electron-donating group.

2. A nonlinear optical medium in accordance with claim 1 wherein is zero.

3. A nonlinear optical medium in accordance with claim 1 wherein n is one.

4. A nonlinear optical medium comprising a transparent solid substrate with a surface coating of at least one monomolecular layer of uniaxial aligned quinodimethane molecules corresponding to the formula:

where R is a substituent selected from aliphatic, alicyclic and aromatic groups containing between about 6–30 carbon atoms, and R¹ is hydrogen or a R substituent.

5. A nonlinear optical medium in accordance with claim 4 wherein the surface coating comprises at least two monomolecular layers of uniaxial aligned quinodimethane molecules.

6. A nonlinear optical medium in accordance with claim 4 wherein the surface coating is a Langmuir-Blodgett deposition of at least one monomolecular layer of uniaxial aligned quinodimethane molecules.

7. A nonlinear optical medium in accordance with claim 4 wherein the R substituent in the quinodimethane formula is an aliphatic group containing between about 10–20 carbon atoms.

8. A nonlinear optical medium in accordance with claim 4 wherein the R substituent in the quinodimethane formula is an alkyl group containing between about 10–20 carbon atoms, and R¹ is hydrogen.

9. A nonlinear optical medium in accordance with claim 4 wherein the quinodimethane is 13,13-di(n-hexadecylamino)-14,14-dicyanodiphenylquinodimethane.

10. A nonlinear optical medium comprising a transparent solid substrate with a surface coating of at least one monomolecular layer of uniaxial aligned quinodimethane molecules corresponding to the formula:

where R is a substituent selected from aliphatic, alicyclic and aromatic groups containing between about 6–30 carbon atoms, and R¹ is hydrogen or a R substituent.

11. A nonlinear optical medium in accordance with claim 10 wherein the surface coating comprises at least two monomolecular layers of uniaxial aligned quinodimethane molecules.

12. A nonlinear optical medium in accordance with claim 10 wherein the surface coating is a Langmuir-Blodgett deposition of at least one monomolecular layer of uniaxial aligned quinodimethane molecules.

13. A nonlinear optical medium in accordance with claim 10 wherein the R substituent in the quinodimethane formula is an aliphatic group containing between about 10–20 carbon atoms.

14. A nonlinear optical medium in accordance with claim 10 wherein the R substituent in the quinodimethane formula is an alkyl group containing between about 10–20 carbon atoms, and R¹ is hydrogen.

15. A nonlinear optical medium in accordance with claim 10 wherein the quinodimethane compound is 13,13-di(n-hexadecylamino)-14,14-dicyano-4,5,9,10-tetrahydropyrenoquinodimethane.

16. A nonlinear optical medium comprising a transparent solid substrate with a surface coating of at least one monomolecular layer of uniaxial aligned quinodimethane molecules corresponding to the formula:

where R is a substituent selected from aliphatic, alicyclic and aromatic groups containing between about 6-30 carbon atoms, and $R^1$ is hydrogen or a R substituent.

17. A nonlinear optical medium in accordance with claim 16 wherein the surface coating comprises at least two monomolecular layers of uniaxial aligned quinodimethane molecules.

18. A nonlinear optical medium in accordance with claim 16 wherein the surface coating is a Langmuir-Blodgett deposition of at least one monomolecular layer of uniaxial aligned quinodimethane molecules.

19. A nonlinear optical medium in accordance with claim 16 wherein the R substituent in the quinodimethane formula is an aliphatic group containing between about 10-20 carbon atoms.

20. A nonlinear optical medium in accordance with claim 16 wherein the R substitutent in the quinodimethane formula is an alkyl group containing between about 10-20 carbon atoms, and $R^1$ is hydrogen.

21. A nonlinear optical medium in accordance with claim 16 wherein the quinodimethane compound is 7,7-di(hexylamino)-8,8-dicyanoquinodimethane.

22. A nonlinear optical medium in accordance with claim 16 wherein the quinodimethane compound is 7,7-di(4-ethoxybutylamino)-8,8-dicyanoquinodimethane.

23. A nonlinear optical medium in accordance with claim 16 wherein the quinomethane compound is 7,7-di(dodecylamino)-8,8-dicyanoquinodimethane.

24. A nonlinear optical medium in accordance with claim 16 wherein the quinodimethane compound is 7,7-di(hexadecylamino)-8,8-dicyanoquinodimethane.

25. A nonlinear optical medium in accordance with claim 16 wherein the quinodimethane compound is 7,7-di(2-chlorodecylamino)-8,8-dicyanoquinodimethane.

26. A nonlinear optical medium in accordance with claim 16 wherein the quinodimethane compound is 7,7-di[di(hexadecyl)amino]-8,8-dicyanoquinodimethane.

27. A nonlinear optical medium in accordance with claim 16 which exhibits a second order susceptibility $\beta$ of at least about $200 \times 10^{-30}$ esu.

28. A nonlinear optical medium in the form of a transparent solid substrate comprising (1) a host thermoplastic polymer; and (2) a guest organic compound which has a quinodimethane structure corrresponding to the formula:

where R' is a substituent selected from hydrogen and aliphatic, alicyclic and aromatic groups containing between about 6-30 carbon atoms; n is an integer with a value between 0-3; and at least one of the R' substituents is an electron-donating group.

29. A nonlinear optical medium in accordance with claim 28 wherein the solid substrate in noncentrosymmetric and exhibits second order nonlinear optical response.

30. A nonlinear optical medium in accordance with claim 28 wherein the solid substrate is centrosymmetric and exhibits third order nonlinear opticals response.

31. A nonlinear optical medium in the form of a transparent solid substrate comprising (1) a host thermoplastic polymer; and (2) a guest organic compound which has a quinodimethane structure corresponding to the formula:

where R is a substituent selected from aliphatic, alicyclic and aromatic groups containing between about 6-30 carbon atoms, and $R^1$ is hydrogen or a R substituent.

32. A nonlinear optical medium in the form of a transparent solid substrate comprising (1) a host thermoplastic polymer; and (2) a guest organic compound which has a quinodimethane structure corresponding to the formula:

where R is a substituent selected from aliphatic, alicyclic and aromatic groups containing between about 6-30 carbon atoms, and $R^1$ is hydrogen or a R substituent.

33. A nonlinear optical medium in the form of a transparent solid substrate comprising (1) a host thermoplastic polymer; and (2) a guest organic compound which has a quinodimethane structure corresponding to the formula:

where R is a substituent selected from aliphatic, alicyclic and aromatic groups containing between about 6-30 carbon atoms, and $R^1$ is hydrogen or a R substituent.

34. An electrooptic light modulating device with a nonlinear optical component comprising a transparent solid substrate with a surface coating of at least one monomolecular layer of uniaxial aligned quinodimethane molecules corresponding to the formula:

where R' is a substituent selected from hydrogen and aliphatic, alicyclic and aromatic groups containing be- tween about 6-30 carbon atoms, n is an integer with a valve between 0-3; and at least one of the R' substituents is an electron-donating group.

35. An electrooptic light modulating device with a nonlinear optical component comprising a transparent solid substrate with a surface coating of at least one monomolecular layer of uniaxial aligned quinodimethane molecules corresponding to the formula:

where R is a substituent selected from aliphatic, alicyclic and aromatic groups containing between about 6-30 carbon atoms, and $R^1$ is hydrogen or a R substituent.

36. An electrooptic light modulating device with a nonlinear optical component comprising a transparent solid substrate with a surface coating of at least one monomolecular layer of uniaxial aligned quinodimethane molecules corresponding to the formula:

where R is a substituent selected from aliphatic, alicyclic and aromatic groups containing between about 6-30 carbon atoms, and $R^1$ is hydrogen or a R substituent.

37. An electrooptic light modulating device with a nonlinear optical component comprising a transparent solid substrate with a surface coating of at least one monomolecular layer of uniaxial aligned quinodimethane molecules corresponding to the formula:

where R is a substituent selected from aliphatic, alicyclic and aromatic groups containing between about 6-30 carbon atoms, and $R^1$ is hydrogen or a R substituent.

38. An electrooptic light modulating device with a nonlinear optical component in the form of a transparent solid medium comprising (1) a host thermoplastic polymer; and (2) a guest organic compound which has a quinodimethane structure corresponding to the formula:

where R' is a substituent selected from hydrogen and aliphatic, alicyclic and aromatic groups containing between about 6-30 carbon atoms; n is an integer with a value between 0-3; and at least one of the R' substituents is an electron-donating group.

39. An electrooptic light modulating device with a nonlinear optical component in the form of a transparent solid medium comprising (1) a host thermoplastic polymer; and (2) a guest organic compound which has a quinodimethane structure corresponding to the formula:

where R is a substituent selected from aliphatic, alicyclic and aromatic groups containing between about 6-30 carbon atoms, and $R^1$ is hydrogen or a R substituent.

40. An electrooptic light modulating device with a nonlinear optical component in the form of a transparent solid medium comprising (1) a host thermoplastic polymer; and (2) a guest organic compound which has a quinodimethane structure corresponding to the formula:

where R is a substituent selected from aliphatic, alicyclic and aromatic groups containing between about 6-30 carbon atoms, and $R^1$ is hydrogen or a R substituent.

41. An electrooptic light modulating device with a nonlinear optical component in the form of a transparent solid medium comprising (1) a host thermoplastic polymer; and (2) a guest organic compound which has a quinodimethane structure corresponding to the formula:

where R is a substituent selected from aliphatic, alicyclic and aromatic groups containing between about 6-30 carbon atoms, and $R^1$ hydrogen or a R substituent.

* * * * *